Figure 1:
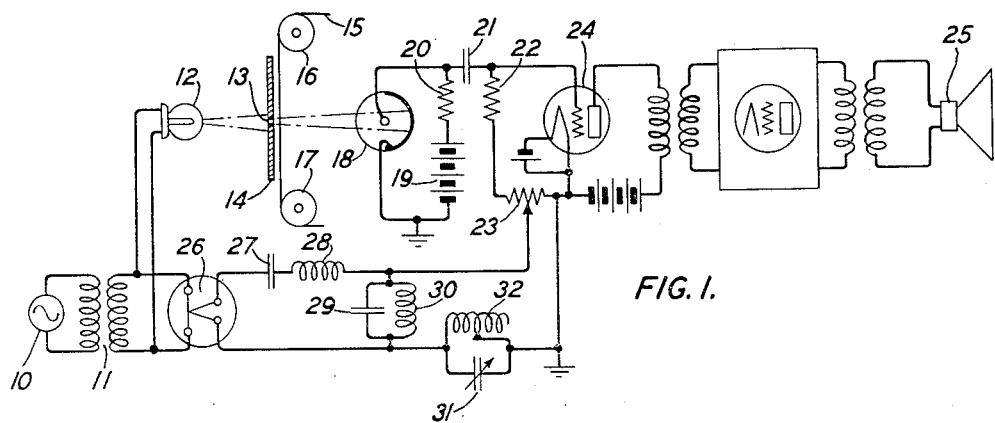

Nov. 7, 1933.  L. S. UPHOFF  1,934,390

FREQUENCY CHANGER

Filed May 9, 1931

INVENTOR
L. S. UPHOFF
BY G. H. Heydt
ATTORNEY

Patented Nov. 7, 1933

1,934,390

UNITED STATES PATENT OFFICE 1,934,390

FREQUENCY CHANGER

Leslie S. Uphoff, Little Falls, N. J., assignor to Bell Telephone Laboratories, Incorporated, New York, N. Y., a corporation of New York Application May 9, 1931. Serial No. 536,143

3 Claims. (Cl. 179—100.3)

This invention relates to frequency changers and has for its object the provision of improved means for changing an alternating current into a unidirectional current pulsating at twice the frequency of the alternating current.

In many electrical circuits, a power consuming device is supplied with power from a constant, unidirectional source, such as a storage battery. There are practical advantages to be obtained by the operation of such devices on power supplied from an alternating current source. The power may be supplied directly from the alternating current circuit or may first be rectified and filtered before being supplied to the device. If the power consuming device is associated with a circuit sensitive to small changes in output, such as a communication circuit, it will frequently be found that the variation in output caused by operation on alternating current produces a noise in the communication circuit. In many cases, the frequency of the variation is twice the frequency of the alternating current.

A study of the current produced by a thermo-junction energized by an element heated by alternating current has shown that the output of the thermo-junction may be analyzed into a unidirectional component of constant magnitude and a component varying with twice the frequency of the alternating current superimposed upon the unidirectional current. In accordance with the present invention, the output of a thermo-junction energized by an element heated by alternating current is introduced into the circuit containing the power consuming device and by suitably controlling the magnitude and phase of the output, the hum in the circuit is substantially neutralized.

Figure 2:
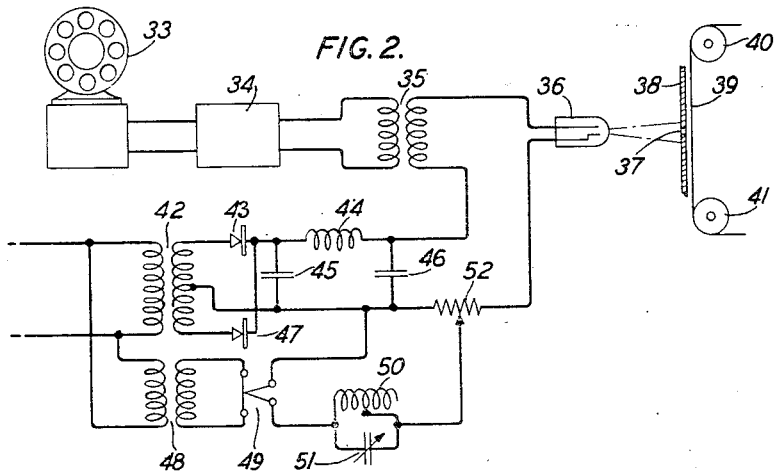
Figure 3:
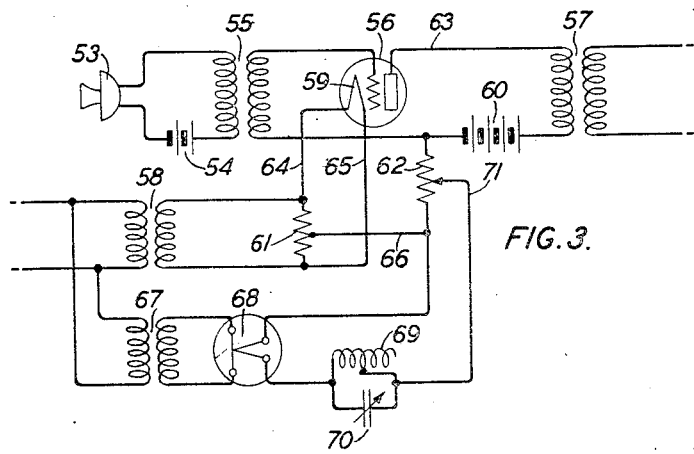

In the drawing:

Fig. 1 schematically represents a sound reproducing system incorporating the invention;

Fig. 2 schematically represents a sound recording system incorporating the invention; and Fig. 3 schematically represents a thermionic amplifier incorporating the invention.

In Fig. 1, power from the alternating current source 10 is supplied through a suitable transformer 11 to an incandescent lamp 12. Light from the lamp 12 is directed to a scanning device represented by a small slit 13 in the opaque plate 14. A sound record printed on the film 15 is traversed at uniform speed by known means such as sprockets 16, 17 past the slit 13. The modulated light transmitted through the film excites a light sensitive device 18, supplied with power from a battery 19 through a resistor 20. The fluctuating voltages developed across the resistor 20 are applied through a capacitor 21 to the resistors 22 and 23 in series across the input circuit of the thermionic amplifier 24. The output of the thermionic amplifier 24, suitably amplified, is reproduced by the loud speaker 25. The variation in the alternating current supplied to the lamp 12 will cause the light from the lamp to vary at twice the frequency of the alternating current and tends to produce a steady hum in the loud speaker 25.

Power is also supplied from transformer 11 to the heater element of a thermo-junction 26. The output of the thermo-junction may, if desired, be modified by passing through a band-pass filter of known type, such as the series capacitor 27 and inductor 28, and the shunt capacitor 29 and inductor 30. The output from the band-pass filter is supplied to a phase shifting network which may consist of a variable capacitor 31 and variable inductor 32 in parallel and is then applied across a portion of the resistor 23. The filtered output from the thermo-junction 26 will consist of a unidirectional component which produces a steady bias on the grid of the thermionic amplifier 24, and a component having twice the frequency of the alternating current which is adjusted in phase and magnitude until it neutralizes the variation producing the hum in the loud speaker 25.

Owing to the similarity in the thermal relation between the light output of an incandescent filament and the power output of a thermo-junction energized by a heater, by proper proportioning of the size of the filament and the heater, the neutralizing current may be made of exactly the right magnitude to maintain substantially complete neutralization over a wide range of variation in the power supplied to the transformer 11.

In Fig. 2 sound waves are detected by the microphone 33, and after suitable amplification in the amplifier 34, are applied through transformer 35 to produce a modulation of the light emitted by lamp 36. The modulated light from lamp 36 is directed on a small slit 37 in an opaque plate 38. A photographic film 39 is traversed behind the opaque plate 38 at uniform speed in the known manner by sprockets 40 and 41. The modulated light will produce a photographic record on the film 39 in the manner known in the sound picture art.

Power from an alternating current source is supplied to transformer 42. The output from transformer 42 is rectified by the rectifiers 43 and 47 and filtered by the series inductor 44 and shunt capacitors 45 and 46 and supplied through transformer 35 to cause lamp 36 to emit light in a known manner. The sound modulated power supplied to the primary of transformer 35 causes the light emitted to vary in accordance with sound. Difficulty is experienced in producing a perfect filter for a rectifier of this type and the output of the rectifier will generally have a small component varying at twice the frequency of the alternating current. If this component is permitted to affect the lamp 36, the sound record will be similarly affected and a hum produced when the record is reproduced.

Power is supplied from the same alternating current source which supplies transformer 42 through transformer 48 to the heater element of a thermo-junction 49. The output of the thermo-junction 49 is supplied through a phase shifting network comprising a variable inductor 50 and a variable capacitor 51 to a variable portion of a resistor 52 inserted in series with the power supply to the lamp 36. By suitably adjusting the phase and magnitude of the current from the thermo-junction 49 introduced into the supply circuit of the lamp 36, the effect of the variation in the output of the rectifiers 43 and 47 may be substantially neutralized.

In Fig. 3 sound waves are detected by the microphone 53 and cause a variation in the current from the battery 54 flowing through the microphone 53 and the primary of the transformer 55. The sound modulated currents induced in the secondary of the transformer 55 are applied to the input circuit of an amplifier 56. The output of the amplifier 56 may be supplied through transformer 57 to any desired communication circuit. While for ease of description only one stage of amplification is shown, it will be obvious to those skilled in the art that further stages of amplification in cascade may be used.

Power is supplied from an alternating current source through transformer 58 to the cathode 59, of the amplifier 56, heating the cathode 59 and causing the cathode to emit electrons in a known manner. Current from battery 60 flows through the primary of the transformer 57 to the anode 63 of the amplifier 56, through the amplifier 56 to the filament 59, wires 64 and 65 in parallel, the halves of resistor 61 in parallel, wire 66, resistor 62 to battery 60. This current flowing in resistor 62 impresses a negative potential on the control electrode of the amplifier 56. The alternating current supplied to the cathode 59 of the amplifier 56 produces a non-uniform emission of electrons varying at twice the frequency of the alternating current and this variation will tend to produce a hum in the output circuit of the amplifier. Power is supplied from the alternating current source through transformer 67 to the heater element of a thermo-junction 68. The phase relation of the output of the thermo-junction 68 may be varied by a phase adjusting network which may comprise a variable reactor 69 and a variable capacitor 70 in parallel. The corrected output of the thermo-junction 68 is impressed across a portion of the resistor 62, and by adjustment of the slide 71 the magnitude of the compensating current may be adjusted. By suitable adjustment of the magnitude and phase of the compensating current, the voltage developed across the part of resistor 62 will neutralize the variation in the output circuit produced by the alternating current supplied to the cathode 59. As the cathode 59 and the heater element of the thermo-junction 68 may both be incandescent bodies in a vacuum, by suitable design they may be made to have the same thermal characteristics. A variation in the supply of power from the alternating current source will then cause the same change in both and the neutralization will not be affected.

What is claimed is:

1. In combination, a source of alternating current, a full wave rectifier energized by said alternating current, means for filtering the output current of said rectifier, a device energized by said filtered current, an element heated by alternating current from said source, a thermo-junction heated by said element, means for controlling the magnitude and phase of the current produced by said thermo-junction, and means for supplying said controlled current to said device to neutralize the pulsations in the output of said device.

2. In combination, a source of signal currents, a source of light modulated by said currents, a sensitive surface moved through light from said source, a source of alternating current, a rectifier energized by alternating current from said source, means for filtering the output of said rectifier and supplying said filtered output to energize said source of light, an element heated by alternating current from said source, a thermo-junction heated by said element, means for controlling the phase of the current produced by said thermo-junction, and means for supplying said controlled current to neutralize pulsations in said filtered output.

3. In combination, a source of signal currents, a source of light modulated by said currents, a sensitive surface moved through light from said source, a source of alternating current, a rectifier and filter energized by alternating current from said source, means for applying the output of said filter to energize said source of light, said means including a variable resistor, an element heated by alternating current from said source, a thermo-junction heated by said element, a network for controlling the phase of the current produced by said thermo-junction, and means for supplying said controlled current to said variable resistor to neutralize pulsations in the output of said filter.

LESLIE S. UPHOFF.